April 14, 1953 S. O. JAKOBSEN 2,634,688
PRESSURE LUBRICATOR
Filed Dec. 29, 1947 3 Sheets-Sheet 1
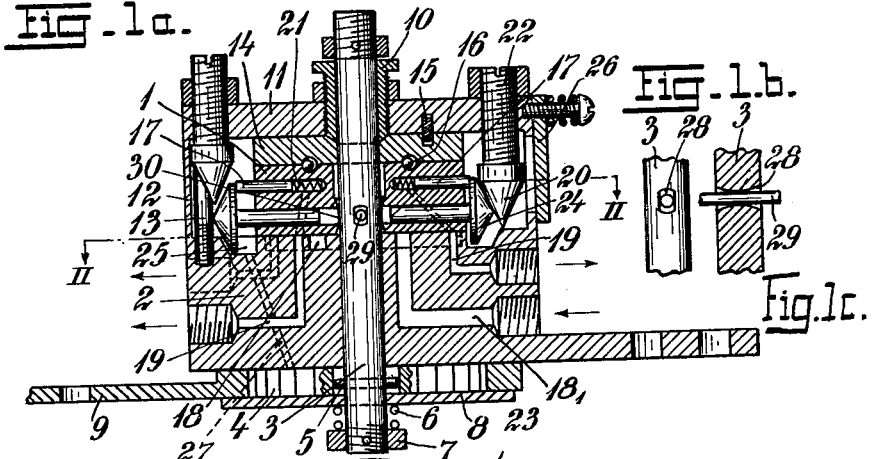
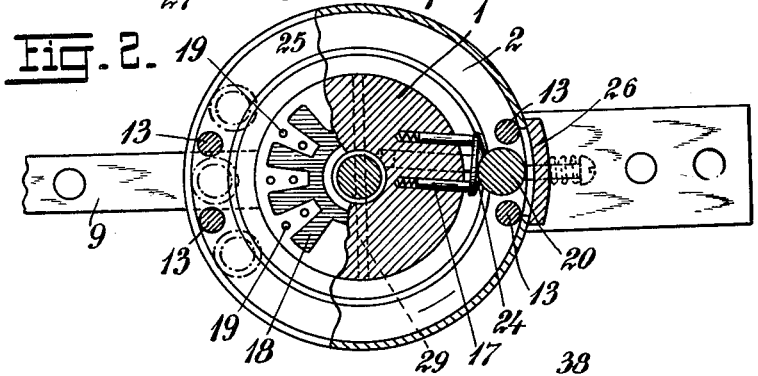
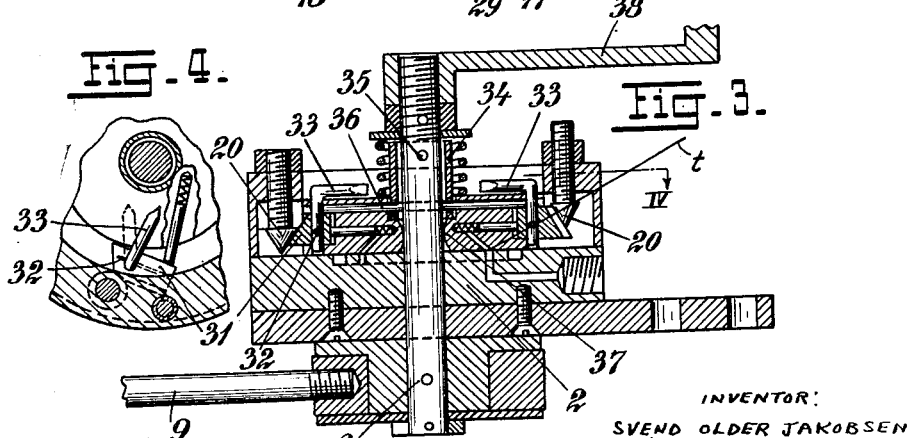
INVENTOR:
SVEND OLDER JAKOBSEN
BY: Michael S. Striker

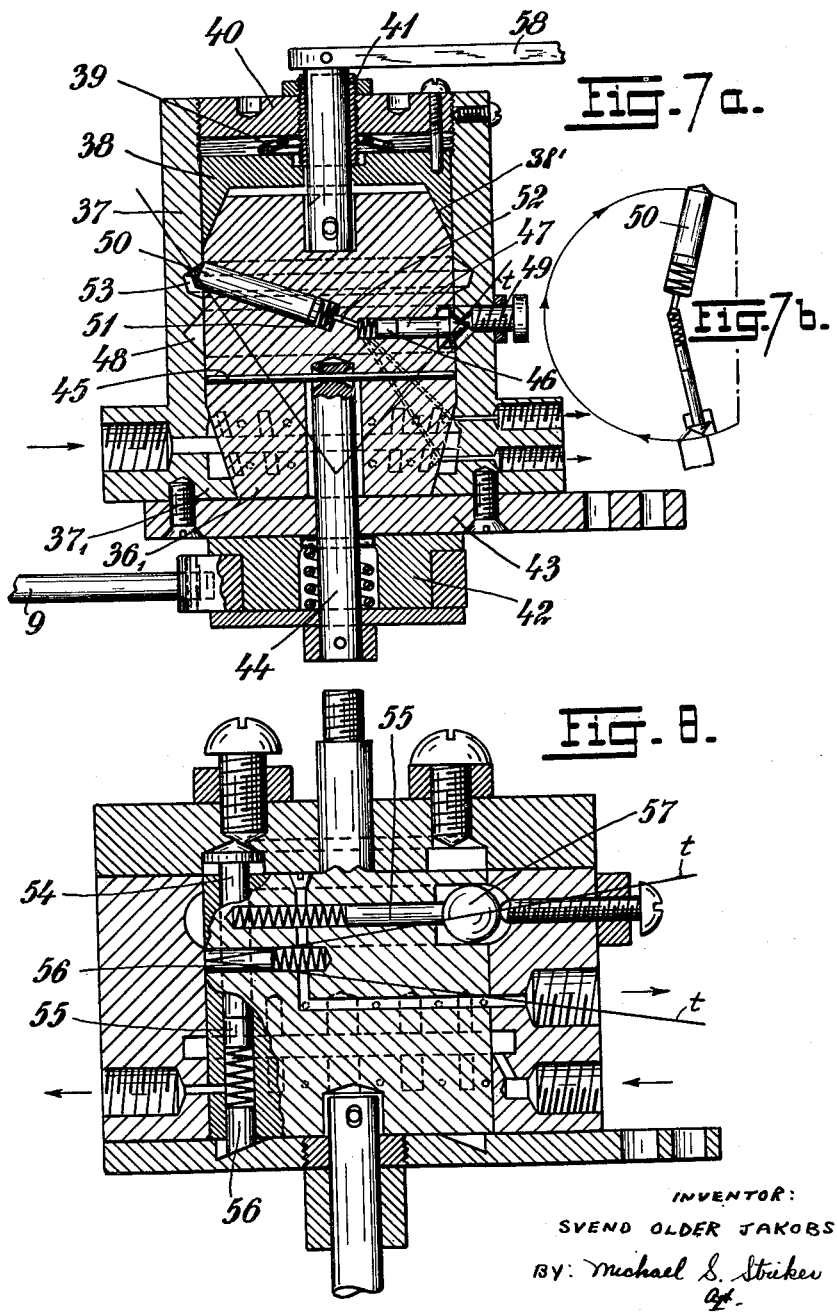

Patented Apr. 14, 1953

2,634,688

UNITED STATES PATENT OFFICE 2,634,688

PRESSURE LUBRICATOR

Svend Older Jakobsen, Haugesund, Norway

Application December 29, 1947, Serial No. 794,402
In Norway March 25, 1944

Section 1, Public Law 690, August 8, 1946
Patent expires March 25, 1964

6 Claims. (Cl. 103—161)

The present invention relates to a pressure lubricator provided with at least one lubrication pump, the cylinder of which successively communicates with the various points to be lubricated during the pressure-stroke, and with an oil suction channel during the suction-stroke. This is obtained by various oil-channels opening into holes provided in the surface of a rotating valve-body as well as in a stationary valve-seat said holes being arranged in such a way that they cover each other, or are shut off from each other respectively during rotation of the valve body. The pump pistons are actuated by suitable stops during the rotation of the valve-body.

It is of the greatest importance for pressure lubricators of this type that the valve-body tightly abuts against its seat. In the conventional types of pressure lubricators the tight fit between the valve-body and its seat will be deteriorated after a comparatively short period owing to the inclined, sidewise stress on the valve-body during the pressure stroke, and, as the valve spindle owing to wearing off may rock to-and-fro, the valve-body as well as the seat will be exposed to uneven wear. It is the object of the present invention to provide a pressure lubricator in which this disadvantage is avoided. The main feature of the invention resides in such an arrangement and in the shape of the members actuating and operating the pump that the pressure exerted on the valve-body during the pressure stroke is directed against the portion of the sliding-surface of the valve-body where the greatest lubricant back pressure on the valve-body is exerted, the resultant of the pressure exerted thereby thrusting the valve-body against the valve-seat with a force which is equally distributed over the entire area of the sliding surface. According to a further feature of the invention the valve-body may, by means of a suitable joint-device, be connected to the driving mechanism or the driving shaft respectively in such way that said valve-body may closely contact the valve-seat independently of any transversal movements. Thereby the advantage is obtained that during the operation of the lubricator the valve will be continuously ground to fit tightly, the pressure of the lubricator thus being kept unchanged. Other features of the invention are described below.

On the accompanying drawings a few embodiments of the invention are shown.

Figure 1a is an axial sectional view of an embodiment of the lubricator; and

Figure 1b, on a somewhat larger scale, shows a side view, and Fig. 1c a sectional view of the joint-device of the valve, the views being at right angles to each other;

Figure 2 is a horizontal sectional view of the lubricator on the lines II and II in Figure 1;

Figure 3 is an axial sectional view of another embodiment of the lubricator;

Figure 4 shows a horizontal partial section on the line IV in Figure 3;

Figure 7a is an axial sectional view of still another embodiment of the lubricator with a conical valve-body;

Figure 7b shows a top view of a lubricating piston cooperating with a back-pressure piston; and Figure 8 is an axial sectional view of still another embodiment of the invention.

Figure 5:
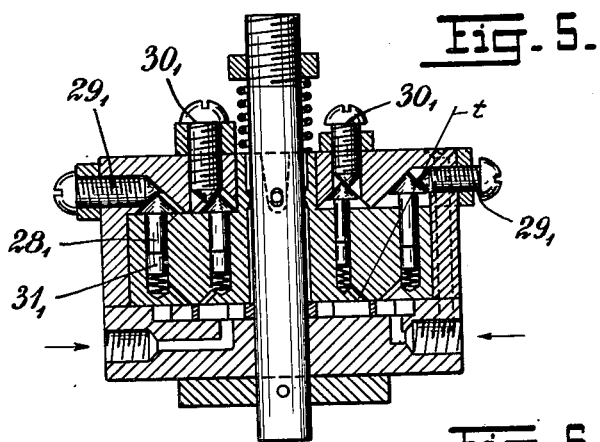
Figure 5 is an axial sectional view of a further embodiment of the lubricator.

According to the embodiment shown in Figure 1a the lubricator comprises a rotatable valve-body 1, the underneath plane-ground bottom surface of which is tightly engaging a valve-seat 2. In the manner described below the valve-body is attached to a spindle 3, axially mounted in the valve-seat, said spindle being as usual driven by means of a ratchet driving wheel 4 secured to the lower end of said spindle. The driving wheel is secured to the spindle by means of a split-pin 5 inserted through the spindle, said split-pin having wedge-shaped ends, engaging axially extending grooves provided in the hub of the driving wheel, in such a way that the spindle may be somewhat displaced axially independently of the driving wheel. The split-pin 5 is also displaceable inside its hole in the spindle, and it may, on account of its wedge-shaped ends, take such a position that both said ends always will actuate the spindle with equal force. Consequently, the split-pin will transfer to the spindle a purely rotary movement, thus avoiding uneven wear of the bearing. The valve-body 1 is thrust resiliently against the plane-ground valve-seat 2 by means of a spring 6 surrounding the lower end portion of the spindle 3, said spring pressing against a nut 7 arranged on the end of the spindle and a plate 8 abutting against the driving-wheel 4. The driving wheel is, in the usual way, rotated intermittently by means of a pawl-device provided with a lever 9.

The spindle 3 is in its upper end housed in an adjustable sleeve 10, which is provided centrally in a cap 11 covering the valve-body 1. The cylindrical wall 12 of said cap abuts against the valve-seat at its lower edge, which is plane-ground together with the sliding surface of the valve-body after the valve-body has been placed in the cap. The cap is secured to the valve-seat by means of screws 13. Between the cap and the upper face of the valve-body an abutting-plate 14 may be placed, the thickness of which may be so as to cause the valve-body to be kept in abutment with the valve-seat. In this case the spring 6 may be dispensed with but, preferably, both abutment plate and spring may be used. The abutment plate is kept in engagement with the cap by means of a split-pin 15, and, with the object of reducing friction, a ball 16 may be provided in an annular groove arranged in the abutment-faces of the plate and of the valve-body. The abutment plate 14 may either be accurately fitted into the space between the cap and the valve-body, or its position may be adjustable by means of the adjustable bearing sleeve 10, the lower end of which abuts against the top-face of the plate.

In transversal cylindrical borings provided in the valve-body 1 a suitable number of pistons 17 are arranged, which move in the way described below. During the suction stroke of the pistons, the lubricant, in the conventional manner, is sucked into the piston cylinders through channels provided in the valve-body (shown by dotted lines). During the suction stroke these channels are put in communication with a star-shaped recess 18 in the valve-seat, said recess communicating with a delivery channel 18' for the lubricant being arranged in the valve-body. During each pressure stroke the channels provided in the valve-body communicate with channels 19 provided in the valve-seat, through which the lubricant is forced to the respective points to be lubricated.

During the rotation of the valve-body the pistons 17 perform their pressure-strokes by being actuated by suitably shaped actuating members 20, whereas the suction strokes are performed under the influence of a spring 21 provided in the piston-cylinders. The abutments 20 have a conical end portion and, in the embodiment shown they consist of conical abutment screws 22 adjustably provided in the cap 11, said abutment screws preferably forming a right angle to the pistons 17. In order to prevent sidewise stress on the pistons the actuating members 20 indirectly actuate the pistons through sliding operating members 23, having conical heads 24. The edge of said heads engages an annular recess 25 in the valve-body in such a way that the outer edge of the recesses form stops for the sliding operating members when they are in their outer positions. The conical abutment head 24 may have a diameter sufficiently large to allow it to actuate two (or a plurality of) pumps simultaneously, as shown in Figure 2. In the same figure is also shown how the sliding operating member 23 and the pistons 17 arranged parallel therewith, are arranged at a suitable angle to the radial direction. In this way the axial component of the force exerted by the abutment head 20 upon the sliding operating member and the pistons is increased. The capacity of any one of the pumps with reference to one particular conical abutment 20 is indicated by the length of the portion of the screw 22 extending above the cap 11. The lower position of the screw, corresponding to the greatest capacity, is determined by the conical end portion 20 engaging the valve-seat, and the upper position, corresponding to the capacity zero is determined by the conical end portion 20 engaging the cap.

The screws 22 are secured in the position chosen for a predetermined capacity by means of locknuts. In the side-wall of the cap is at least one opening covered by a pivotally-mounted lid 26, through which opening, or openings, respectively the pumps may be inspected. For the lubrication of the driving-wheel 4 a channel 27 is provided for delivery of lubricant from the top of the valve-seat.

In order to avoid uneven wear of the sliding-surfaces of the valve-body and the valve-seat which would cause leaking between said surfaces with a subsequent decrease of pressure, it is necessary to press the valve-body against the valve-seat with a uniform pressure, which is equally great per square area unit throughout the entire area of the surfaces. This is particularly important during the pressure stroke, during which the pressure is particularly great in order to prevent the lubricant from forcing its way from the pressure channel into the space between the sliding surfaces. Besides, during the pressure stroke, the lubricant situated in the operating pressure channel will exert a reaction pressure upon the valve-body, said reaction pressure being dependent upon the cross-sectional area of the pressure channel, and tending to urge the valve-body upwardly on the side where the pressure channel and the piston, as well as the corresponding actuating member are located. As a consequence, the sliding surfaces will be thrust against each other with uneven pressure, and the spindle, in the course of time, will tend to rock sideways and the sliding surfaces will become leaky owing to the uneven wear, if no special precautions are taken.

According to the present invention such a precaution has been taken in the fact that the actuating members 20 as well as the heads 24 of the sliding operating members have such a shape, that the inclined pressure, is directed against a point of the sliding-surfaces, situated on the side of the spindle where the reaction-pressure from the operating pressure channel is to be overcome. In Figure 1 the line $t$ indicates an example of a direction of pressure, which is correct under certain conditions. In the case here shown the pressure will act in an inclined direction inwardly towards a point in the abutting-face between the spindle 3 and the pressure channel, the back pressure from which will try to force the valve-body upwardly on one side. The position of the point mentioned, which may be designated "the average pressure point", is dependent upon the reaction-pressure exerted from the pressure channel on the valve-body, as well as upon the distance of this channel from the spindle, and the conical portions 20 as well as the conical heads 24 must be so constructed that the pressure extends through the average pressure point. By correctly choosing the abutments, the pressure may press the valve-body against the valve-seat with a uniform pressure throughout its entire surface, with result that the abutting-faces are continuously ground to an exact fit during the operations of the lubricator.

On account of wear during the operation of the lubricator the spindle 3 gradually will tend to rock somewhat in a lateral direction, and even the slightest rocking will cause uneven wear of the sliding surfaces of the valve-body and the seat, resulting in leaking, if the valve-body is rigidly connected with the spindle. In order to enable the valve-body to constantly abut tightly against the valve-seat, even if there is a rocking movement of the spindle, said valve-body is connected to the latter by means of a joint acting as a universal joint. According to the embodiment shown in Figures 1a, 1b and 2 said joint consists of a split-pin 29 inserted through a hole 28 in the spindle, the ends of said split-pin being attached to the valve-body. As it is most clearly illustrated in Figure 1b the upper and lower edge of the hole are convexly tapering from the middle of the hole towards the ends of same, in such a manner that the spindle is allowed to tilt a little in a plane through the split-pin without transferring any force at all to the split-pin or to the valve-body respectively. At the same time the spindle will be allowed to tilt with the split-pin as a rotation axis. Furthermore, the spindle extends through the valve-body with a certain clearance, except at one point where the spindle-hole has a narrowed portion 30. This narrowed portion, situated on a level with the split-pin 29, has an inwardly curved annular face, abutting against the spindle and centering the same, and preventing any possible swinging or rocking movement of the spindle from being transferred to the valve-body. It is evident that the valve-body is thereby, within certain limits, freely tiltable on the spindle, so that the valve-body cannot be forced out of its engagement with the valve-seat, even if the bearing holes in the valve-seat as well as in the sleeve 10 are worn.

It is of importance that the split-pin 29 and the narrowed hole portion 30 are arranged substantially on a level with the abutment 20, lest a certain undesired moment arise, trying to turn the valve-body out of its correct position.

In Figures 3 and 4 another embodiment of the lubricator is shown. Here the main features are identical with those already described, but instead of the sliding-members 23 for an indirect actuation of the pistons as shown in Figure 1a tiltable members 31 are used, provided with slanting abutting-faces, said members 31, during the rotation of the valve-body 1, engaging the actuating members 20 and thereby tiling inwardly. Said members 31 thereby abut against the pistons and displace the same inwardly in their respective cylinders. After completed pressure stroke the members 31 are tilted back into their starting position by the piston springs. Said members are, by means of split-pins, secured to pins 32, pivotally mounted in the valve-body. Such pins may be provided with angular arms 33, the movements of which determine the pump-strokes. In the embodiment here described, the joint connecting the spindle 3 with the valve-body 1, comprises a sleeve 34, loosely embracing the spindle. The upper end of said sleeve is, by means of a split-pin 35, pivotally attached to the spindle, while the lower end of said sleeve is in association with another split-pin 36, provided at right angle to the split-pin 35, said split-pin 36 being secured to the spindle as well as to the valve-body. The split-pin 36 is mounted in holes in the lower end of the sleeve, said holes having a certain clearance in the vertical direction, so that the sleeve may tilt a little in relation to the spindle and the valve-body. Similarly to the device shown in Figure 1c, the valve-body is centered on the spindle only at the narrowed portions 37 provided in the spindle-boring of the valve-body. The narrowed portion 37 has an inwardly curved, annular face, and is arranged substantially on a level with the abutments 20.

Figure 6:
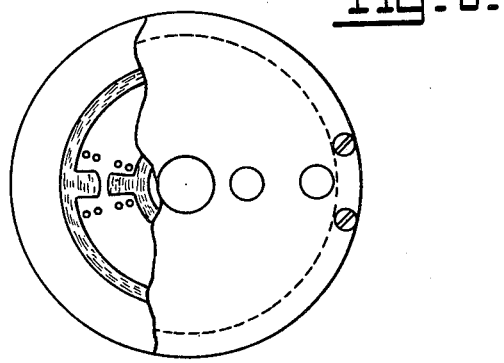
Figure 6 is a top view of the same, the lid, and both lid and valve-body respectively, being removed.

In Figures 5 and 6 an embodiment of the lubricator is shown in which the abutment-heads of the sliding operating member 28 are provided directly above the valve-body. The actuating screws 29, 30 may as shown be provided horizontally as well as vertically in such a way that, for all the screws, the pressure direction t will be correct. The sliding members are displaceable in the pump-cylinders proper actuating the pistons 31 in such manner that they will not be exposed to any lateral stress. In all other respects the operation of the lubricator is as previously described.

In Figure 7a an embodiment of the lubricator is shown, wherein the valve-body 36, at its lower end is provided with a conical sliding surface, abutting against a correspondingly conical valve-seat 37, the upper portion of which being cylindrical. The top end of the valve-body has a guiding-cone, which is surrounded by a conical sleeve 38 adjustably inserted in a cylindrical extension of the valve-seat. Said sleeves are kept in engagement with the valve-body by means of a spring 39, and its upper position can be adjusted by means of a sleeve-shaped screw 41 provided in the lid 40. The driving mechanism 42 is mounted on the spindle 44 projecting out of the bottom-piece 43, to which spindle the valve-body is displaceably secured by means on a transversal split-pin 45 housed in the spindle. On removing the bottom-piece 43 the lower face of the valve-body may be plane-ground together with the lower edge of the valve-seat, whereby the valve-body will abut against the bottom-piece in order not to stick in the cone of the valve-seat.

In this figure the valve-body is provided with a piston 46, which is actuated by a sliding operating member 47. The conical abutment-head of said sliding operating member moves in a groove 48 provided in the cylindrical wall of the valve-seat and is actuated by an actuating-screw 49. The various channels of the lubricator are arranged in the usual way. In order to overcome the transversal pressure caused by the abutment upon the valve-body, an hydraulical reaction-pressure is used. For this purpose a cylinder with a piston 50 is provided in the valve-body, substantially diametrically relatively to the piston-cylinder, said piston 50 being kept under pressure by means of a spring 51. The piston-cylinder and the back-pressure cylinder are interconnected by a channel 52. The outer, conical end of the piston 50 is thrust against the upper, slanting edge of an annular groove 53 provided in the cylindrical portion of the valve-seat, whereby the piston exerts a back-pressure acting on the valve-body in such a way that the lateral stress from the piston-cylinder is overcome. The piston 50 and/or the abutment face of the groove 53 have such slanting position that the abutment pressure from the piston 50 will overcome the sideways stress from the abutment-screw 49 as well as the lubricant pressure from the functioning pressure channel. The arrangement of the pump- and back-pressure-pistons is shown diagrammatically in Figure 7b. The inclined downwardly actuating abutment-pressures are indicated by the lines t.

Figure 8 shows a lubricator with a cylindrical valve-body, wherein transversal as well as longitudinal sliding operating members and pump-pistons 54 and 55 and also corresponding back-pressure pistons 56 are provided. The operating member may also have the shape of a ball 57. The operation of the lubricator is the same as described in connection with Figure 7a.

In all the previously described lubricators the spindle of the valve-body may also be provided with crank-handle 58 (Figures 3 and 7a) arranged either at one or at both ends for the purpose of driving the lubricator by hand.

It is obvious that constructional details of the invention may be changed without departing from the scope of the invention. For instance, the pump-pistons may, in a way known per se, be provided in the outer cap, in which event the only purpose of the hydraulical back-pressure piston is the eliminating of the lubricant pressure derived from the evacuation channel in the common valve. The pump-pistons may also, without the use of springs, be actuated for the pressure stroke by stationary actuating abutments and for the suction-stroke by adjustable abutments.

I claim:

1. A pressure lubricator comprising in combination: a plurality of lubricator pumps each including a cylinder and a pump piston slidably arranged in said cylinder; a rotatable valve body adapted to bring said cylinders, one after the other in succession, into communication with the various points to be lubricated during the pressure stroke; a valve seat; and abutments adapted to move said pump pistons during the rotation of said valve body; cylinders in said valve body; and sliding members displaceably arranged in said cylinders in said valve body, said sliding members transferring the pressure from said abutments to said pistons, one of said sliding members being adapted for simultaneous actuation of a plurality of said pistons.

2. A pressure lubricator comprising in combination, a stationary valve body provided with a valve seat and formed with inlet and outlet conduits terminating in said valve seat; a rotatable valve member having a valve face slidably engaging said valve seat of said stationary valve body and formed with at least one channel adapted to communicate with said conduits in said stationary valve body during rotation of said rotatable valve member about an axis extending normal to said valve seat of said stationary valve body and said valve face of said rotatable valve member; at least one lubricating pump arranged in said valve body and including a cylinder, and a piston slidably mounted therein, said cylinder communicating with said channel in said rotatable valve member; an elongated operating member mounted on said rotatable valve member longitudinally slidably along a linear path and engaging said piston for a sliding movement of the same in one direction, said operating member having an outer conical end portion; an adjustable actuating member mounted on said stationary valve body adapted to actuate said operating member when said rotatable valve member rotates and adjustably movable along a linear path which forms with said linear path of said slidable operating member an angle equal to a multiple of 90°, and having a conical end portion adapted to engage said conical end portion of said operating member, said two conical end portions being shaped so as to contact each other along a generatrix when said operating member is in a position of maximal displacement; and means for adjusting the position of said adjustable actuating member in axial direction and for holding it in such adjusted position.

3. A pressure lubricator comprising in combination, a stationary valve body provided with a valve seat and formed with inlet and outlet conduits terminating in said valve seat; a rotatable valve member having a valve face slidably engaging said valve seat of said stationary valve body and formed with at least one channel adapted to communicate with said conduits in said stationary valve body during rotation of said rotatable valve member about an axis extending normal to said valve seat of said stationary valve body and said valve face of said rotatable valve member; at least one lubricating pump arranged in said valve body and including a cylinder, and a piston slidably mounted therein, said cylinder communicating with said channel in said rotatable valve member; an elongated operating member mounted on said rotatable valve member longitudinally slidably along a linear path and engaging said piston for a sliding movement of the same in one direction, said operating member having an outer conical end portion; an adjustable actuating member mounted on said stationary valve body adapted to actuate said operating member when said rotatable valve member rotates and adjustably movable along a linear path which forms with said linear path of said slidable operating member an angle equal to a multiple of 90°, and having a conical end portion adapted to engage said conical end portion of said operating member, said two conical end portions being shaped so as to contact each other along a generatrix when said operating member is in a position of maximal displacement and sloped at such an angle that a pressure is exerted on said rotatable valve seat counteracting the reaction pressure of the expelled lubricant; and means for adjusting the position of said adjustable actuating member in axial direction and for holding it in such adjusted position.

4. A pressure lubricator comprising in combination, a stationary valve body provided with a valve seat and formed with inlet and outlet conduits terminating in said valve seat; a rotatable valve member having a valve face slidably engaging said valve seat of said stationary valve body and formed with at least one channel adapted to communicate with said conduits in said stationary valve body during rotation of said rotatable valve member about an axis extending normal to said valve seat of said stationary valve body and said valve face of said rotatable valve member; a driving spindle driving said rotatable valve member; universal joint means connecting said driving spindle to said rotatable valve member; at least one lubricating pump arranged in said valve body and including a cylinder, and a piston slidably mounted therein, said cylinder communicating with said channel in said rotatable valve member; an elongated operating member mounted on said rotatable valve member longitudinally slidably along a linear path and engaging said piston for a sliding movement of the same in one direction, said operating member having an outer conical end portion; an adjustable actuating member mounted on said stationary valve body adapted to actuate said operating member when said rotatable valve member rotates and adjustably movable along a linear path which forms with said linear path of said slidable operating member an angle equal to a multiple of 90°, and having a conical end portion adapted to engage said conical end portion of said operating member, said two conical end portions being shaped so as to contact each other along a generatrix when said operating member is in a position of maximal displacement and sloped at such an angle that a pressure is exerted on said rotatable valve seat counteracting the reaction pressure of the expelled lubricant; and means for adjusting the position of said adjustable actuating member in axial direction and for holding it in such adjusted position.

5. A pressure lubricator comprising in combination, a stationary valve body provided with a valve seat and formed with inlet and outlet conduits terminating in said valve seat; a rotatable valve member having a valve face slidably engaging said valve seat of said stationary valve body and formed with at least one channel adapted to communicate with said conduits in said stationary valve body during rotation of said rotatable valve member about an axis extending normal to said valve seat of said stationary valve body and said valve face of said rotatable valve member; a driving spindle driving said rotatable valve member; universal joint means connecting said driving spindle to said rotatable valve member; at least one lubricating pump arranged in said valve body and including a cylinder, and a piston slidably mounted therein, said cylinder communicating with said channel in said rotatable valve member; an elongated operating member mounted on said rotatable valve member longitudinally slidably along a linear path and engaging said piston for a sliding movement of the same in one direction, said operating member having an outer conical end portion; a substantially cylindrical cap member enclosing said rotatable valve member and having a lower edge abutting against said valve seat; adjustable spring means urging said rotatable valve member and said cap member against said valve seat; an adjustable actuating member mounted on said cap member adapted to actuate said operating member when said rotatable valve member rotates and adjustably movable along a linear path which forms with said linear path of said slidable operating member an angle equal to a multiple of 90°, and having a conical end portion adapted to engage said conical end portion of said operating member, said two conical end portions being shaped so as to contact each other along a generatrix when said operating member is in a position of maximal displacement and sloped at such an angle that a pressure is exerted on said rotatable valve seat counteracting the reaction pressure of the expelled lubricant; and means for adjusting the position of said adjustable actuating member in axial direction and for holding it in such adjusted position.

6. A pressure lubricator comprising in combination, a stationary valve body provided with a valve seat and formed with inlet and outlet conduits terminating in said valve seat; a rotatable valve member having a valve face slidably engaging said valve seat of said stationary valve body and formed with at least one channel adapted to communicate with said conduits in said stationary valve body during rotation of said rotatable valve member about an axis extending normal to said valve seat of said stationary valve body and said valve face of said rotatable valve member; at least one lubricating pump arranged in said valve body and including a cylinder, and a piston slidably mounted therein, said cylinder communicating with said channel in said rotatable valve member; an elongated operating member mounted on said rotatable valve member longitudinally slidably along a linear path and engaging said piston for a sliding movement of the same in one direction, said operating member having an outer conical end portion; an adjustable actuating member mounted on said stationary valve body adapted to actuate said operating member when said rotatable valve member rotates and adjustably movable along a linear path which forms with said linear path of said slidable operating member an angle equal to a multiple of 90°, and having a conical end portion adapted to engage said conical end portion of said operating member, said two conical end portions being shaped so as to contact each other along a generatrix when said operating member is in a position of maximal displacement; at least one reaction cylinder arranged in said rotatable valve member substantially diametrically opposite to said lubricating pump and communicating with said cylinder of said lubricating pump; a piston slidingly arranged in said reaction cylinder projecting out of it and abutting with its outer end against an annular groove in said valve body, said reaction cylinder and said piston sliding therein being inclined in such direction as to exert a pressure on said rotatable valve member counteracting components of the pressures exerted by said actuating member and by the expelled lubricant tending to tilt said valve member.

SVEND OLDER JAKOBSEN.

References Cited in the file of this patent

UNITED STATES PATENTS

| Number | Name | Date |
|---|---|---|
| 1,431,492 | Schneeweiss | Oct. 10, 1922 |
| 1,714,148 | Weldy | May 21, 1929 |
| 2,069,651 | Ferris | Feb. 2, 1937 |
| 2,117,521 | Stevens | May 17, 1938 |
| 2,143,936 | Chandler | Jan. 17, 1939 |
| 2,277,570 | Vickers et al. | Mar. 24, 1942 |
| 2,300,009 | Rose | Oct. 27, 1942 |